US010197738B2

(12) United States Patent
Lee et al.

(10) Patent No.: US 10,197,738 B2
(45) Date of Patent: Feb. 5, 2019

(54) MICRO-ELECTRO-MECHANICAL SYSTEMS (MEMS) ACTUATOR THAT ROTATES DISCRETE OPTICAL ELEMENTS

(71) Applicant: DICON FIBEROPTICS, INC., Richmond, CA (US)

(72) Inventors: Jeffrey B. Lee, El Sobrante, CA (US); Rong Ping Hsia, Pleasanton, CA (US); Robert E. Schleicher, Danville, CA (US); Ho-Shang Lee, El Sobrante, CA (US)

(73) Assignee: DICON FIBEROPTICS, INC., Richmond, CA (US)

( * ) Notice: Subject to any disclaimer, the term of this patent is extended or adjusted under 35 U.S.C. 154(b) by 0 days.

(21) Appl. No.: 15/655,534

(22) Filed: Jul. 20, 2017

(65) Prior Publication Data
US 2018/0329147 A1    Nov. 15, 2018

Related U.S. Application Data

(60) Provisional application No. 62/505,874, filed on May 13, 2017.

(51) Int. Cl.
*G02B 6/42* (2006.01)
*G02B 6/35* (2006.01)
*G02B 26/08* (2006.01)
*G02B 6/32* (2006.01)

(52) U.S. Cl.
CPC ............ *G02B 6/3518* (2013.01); *G02B 6/32* (2013.01); *G02B 6/3534* (2013.01); *G02B 6/4206* (2013.01); *G02B 6/4243* (2013.01); *G02B 6/4295* (2013.01); *G02B 26/085* (2013.01)

(58) Field of Classification Search
CPC ...... G02B 6/3518; G02B 6/32; G02B 6/3534; G02B 6/4206; G02B 6/4243; G02B 6/4295; G02B 6/085
USPC .......................................... 385/16–23, 88–92
See application file for complete search history.

(56) References Cited

U.S. PATENT DOCUMENTS

| 6,628,856 B1 | 9/2003 | Costello et al. |
| 6,838,738 B1 | 1/2005 | Costello et al. |
| 7,899,330 B2 | 3/2011 | Ye et al. |
| 2003/0063838 A1* | 4/2003 | Hagood ................ G02B 6/022 385/16 |

* cited by examiner

Primary Examiner — Michael Mooney
(74) Attorney, Agent, or Firm — Vierra Magen Marcus LLP

(57) ABSTRACT

A Micro-Electro-Mechanical Systems (MEMS) actuator can rotate other, discrete optical elements that may be dimensionally large (especially in terms of thickness), may be of relatively large mass, and may be made of dissimilar materials (i.e., some material other than silicon). The rotating optical element may be reflective or transmissive. The MEMS actuator is used in multiple additional embodiments, allowing the integration of multiple optical functions into a single optical component, for a variety of applications. These optical functions include optical switching, optical attenuation, tunable optical filtering, the adjustment of the phase angle of an optical signal, and the detection or receiving of an optical signal or optical power level.

28 Claims, 12 Drawing Sheets

MICRO-ELECTRO-MECHANICAL SYSTEMS (MEMS) ACTUATOR THAT ROTATES DISCRETE OPTICAL ELEMENTS

PRIORITY CLAIM

This application claims the benefit of U.S. provisional pat. app. 62/505,874, filed May 13, 2017, which is hereby incorporated in its entirety by this reference.

BACKGROUND

The following relates generally to the optical components used in optical communication networks, and specifically to a Micro-Electro-Mechanical Systems (MEMS) actuator that is used to rotate a discrete optical element, mounted to the MEMS actuator. More specifically, the following relates to the use of a MEMS actuator and rotating optical element to implement a variety of integrated optical components, providing functions that are useful in optical networks.

Optical components that switch, attenuate, filter, and process optical signals are widely deployed in optical networks, typically in the 1550 nm or 1310 nm wavelength windows. In many of these optical components, a rotating mirror is used as a beam-steering element. In these optical components that use rotating mirrors, Micro-Electrical-Mechanical System (MEMS) devices are often used to implement the rotating mirror or tilt-mirror element. In some prior art embodiments, the MEMS rotating mirror or tilt-mirror is fabricated from silicon using semiconductor processing methods and equipment. The mirror is fabricated as an integral part of the silicon device structure, and is often coated with a thin metallic layer (or layers), using gold, aluminum, or some combination of metal layers to achieve high reflectivity at the appropriate wavelengths.

FIG. 1 illustrates a representative prior art optical component that uses a rotating MEMS tilt-mirror as a beam-steering element, along with other fixed optical elements, excerpted from U.S. Pat. No. 6,838,738. Optical signals enter the optical component via one or more input fibers, 101 and 102. In this prior art embodiment, the input fibers and one or more output fibers, 103 and 104, are held in a single ferrule, 105, typically made of glass. The fiber ferrule 105 may have multiple bore holes, or a single bore hole that holds all of the input and output fibers. Light from the input fiber(s) then passes through a lens, 106, which is designed to form a collimated beam. The collimated beam may pass through one or more additional optical elements, represented generically in FIG. 1 by element 107. Note that depending on the nature of the function being performed by the optical component, optical element 107 might be an optical filter, or a diffraction grating, or some other form of passive, fixed optical element. In the case of a simple optical switch or attenuator, there might not be any need for optical element 107. The collimated beam then hits the reflective surface of a rotating MEMS tilt-mirror, 109, which is attached to, and rotated by, the MEMS device's actuator structure and chip framework, 108. It should be noted that in most embodiments of MEMS tilt-mirror devices, the rotating mirror 109 is an integral part of the MEMS device structure, and is made of the same material as the rest of the device, 108, including the portion of the MEMS device that serves as an actuator of the mirror rotation.

The MEMS device 108 will typically be mounted onto a chip header of some kind, shown as item 110, with electrical pins 111 that are used to carry control signals or voltages to the MEMS device, in order to control the rotating of the MEMS tilt-mirror 109. Some form of packaging or housing, 112, is used to position the lens 106 and other optical elements in the proper location and alignment, with respect to the MEMS device, and also to provide protection from environmental conditions.

Light that is reflected by the MEMS tilt-mirror 109 then passes back through the optional optical element 107, and is focused by the lens 106 onto the end-face of the fiber ferrule 105. Depending on the amount of tilt or rotation that is applied to the MEMS tilt-mirror, the light will be focused onto the core of one of the output fibers, 103 and 104, providing an optical switch function, or, alternatively, the focused beam may be only partially aimed at an output fiber, thereby achieving attenuation of the optical signal. The MEMS tilt-mirror may also be aimed such that there is minimal light coupled to any of the output fibers, creating a blocking, or OFF state.

FIGS. 2A and 2B show conceptual drawings of a prior art, single-axis MEMS tilt-mirror, to illustrate the basic principles of operation. In FIG. 2A, excerpted from U.S. Pat. No. 6,628,856, the rotating MEMS tilt-mirror 2A01 is suspended from an outer frame by torsion beams 2A02 and 2A03. These torsion beams define the rotational axis of the tilt-mirror 2A01, and also serve as torsion springs, applying a centering spring force that resists the tilting of the mirror 2A01. The rotational axis of the MEMS tilt-mirror is shown as item 2A04. In many MEMS tilt-mirrors, the device is fabricated from silicon, a crystalline material. Even though silicon is quite rigid, the torsion beams 2A02 and 2A03 can be designed to be thin enough and long enough to bend in response to an applied force. Typical range of motion for such a device can be as little as a fraction of a degree, or as large as 10 degrees, or even more, depending on the design of the device, as well as the applied voltage(s).

In many MEMS tilt-mirror devices, rotational force is applied in the form of electrostatic actuators, often using large numbers of interlaced comb fingers, and the application of precise control voltages to the comb fingers, as shown conceptually in FIG. 2B. Electrostatic actuation of MEMS devices is described in detail in U.S. Pat. No. 6,838,738, as well as in other prior art patents. However, the basic principle is represented in FIG. 2B. The rotating MEMS mirror 2B01 is suspended by torsion beams 2B02, which attach to a fixed outer frame, or torsion beam anchor points, 2B03. Comb fingers 2B07 are attached to the rotating part of the structure, whereas the interlaced comb fingers 2B04 are attached to the fixed part of the structure, 2B05 and 2B06. Note that the torsion beam anchor points 2B03, and the fixed comb finger areas 2B05 and 2B06, are all part of the fixed framework of the device. When a voltage difference is applied between or across the two sets of comb fingers, 2B07 and 2B04, a force is created that serves to rotate or tilt the tilt-mirror 2B01. The amount of rotation is a function of the design of the structure, the number and geometry of the comb fingers, the spring constant of the torsion beams, and the applied voltage. By precisely controlling the applied voltage, a precise tilt angle can be achieved, and maintained.

FIG. 3 shows a conceptual drawing of a two-axis MEMS tilt-mirror, excerpted from U.S. Pat. No. 6,628,856. The tilt-mirror 301 is suspended by torsion beams 302 and 303, from an intermediate "gimbal" structure or framework, 304. This gimbal structure is in turn suspended by torsion beams 305 and 306, from the MEMS device outer framework 307. Although not shown in FIG. 3, two sets of comb finger actuators are needed. One set is used to tilt the tilt-mirror 301 within the gimbal structure 304, and the other set of comb fingers is used to tilt the gimbal structure 304 within the outer framework 307. The two sets of comb finger actuators are electrically isolated from each other, so that the degree of tilt for the two rotational axes can be separately controlled. This sort of two-axis MEMS tilt-mirror can be used to steer the optical beam in three-dimensional space, along two axes of rotation.

As discussed earlier, it is often desirable to combine a MEMS tilt-mirror with other optical elements. FIG. 4 shows a conceptual view of a prior art tunable optical filter, in which a MEMS tilt-mirror is used to steer an optical beam that passes through a fixed-position diffraction grating, and is excerpted from U.S. Pat. No. 7,899,330. Sub-assembly 401 comprises a fiber ferrule that holds an input fiber and an output fiber, and a collimating lens. The optical signal on the input fiber consists of multiple wavelengths, each carrying its own information. The multi-wavelength collimated beam that emerges from sub-assembly 401 passes through a diffraction grating 402, which serves to disperse the multiple wavelengths, such that they exit the diffraction grating at slightly different angles. All of the dispersed wavelengths hit the surface of rotating MEMS tilt-mirror 404, which is mounted on a chip header or other structure 405. The precise tilt angle of the tilt-mirror 404 is controlled by the voltage control circuit 406. Based on the applied voltage, and the resulting tilt angle, only a small subset of the input wavelength range (for example, a single selected wavelength) will be aimed or directed properly, back through the diffraction grating 402, to sub-assembly 401 and the core of the output fiber. In FIG. 4, an additional optical element 403 is also shown. For example, a quarter-wave plate may be used to rotate the polarization of the light between the two passes of the diffraction grating, in order to reduce polarization-dependent loss (PDL) in the selected wavelength.

In the prior art embodiments described above, the moving part of the optical component has been a mirror, used to steer optical beams, or to change the incident angle of light onto other optical elements that are fixed in place. For some optical component designs, however, it is desirable or useful to be able to move other types of optical elements. For example, tunable optical filters may be implemented by physically moving or rotating thin-film optical filter chips, or diffraction gratings. FIG. 5 shows a prior art embodiment of a tunable optical filter that uses a rotating thin-film filter chip. The thin-film filter chip may be implementing a Fabry-Perot filter with a single resonant cavity. Or, it may be a multi-cavity optical filter, with a flatter passband. Multiple wavelengths on an input fiber, represented by $\lambda_o$, $\lambda_i$, and $\lambda_n$, pass through sub-assembly 501, comprising a single-fiber ferrule and a collimating lens, and then pass through a thin-film filter chip 502, that can be rotated via some mechanism, such as a small motor, or even a manual mechanism. A single selected wavelength, represented by $\lambda_i$, or a range of wavelengths, is passed to sub-assembly 503, comprising a focusing lens and a single-fiber ferrule, and is then coupled to the output fiber. The filter chip itself is designed to pass a single, fixed wavelength, or range of wavelengths, when the angle of the chip to the incident beam is 90 degrees. However, when the incident angle of the multi-wavelength beam is changed, by rotating the thin-film filter chip, the selected or tuned wavelength is changed or shifted, to a longer wavelength. Similarly, in the prior art embodiment shown in FIG. 4, instead of rotating the tilt-mirror 404, wavelength tuning could also be achieved by physically rotating the diffraction grating.

SUMMARY

In one set of embodiments, a device includes a micro-electro-mechanical system (MEMS) actuator and an optical element. The micro-electro-mechanical system (MEMS) actuator has a first section and a second section. The actuator is configured to rotate the second section relative to the first section in response to a voltage difference applied to the MEMS actuator. The second section has an aperture, and the optical element, which is formed separately from the MEMS actuator, is located in the aperture and attached to the second section.

In another set of embodiments, an optical device has an optical input port and a photodetector positioned in an optical path from the input port. The optical device also includes a micro-electro-mechanical system (MEMS) actuator having a first section and a second section, wherein the first section is mounted in a fixed position within the optical device, and the actuator is configured to rotate the second section relative to the first section in response to a voltage difference applied MEMS actuator, wherein the second section has an aperture. A transmissive optical element is mounted in the aperture and attached to the second section, wherein the transmissive optical element is configured to be located in the optical path between the optical input port and the photodetector.

In an additional embodiment, an optical device includes a housing, a first window in the housing, a second window in the housing. The optical device also includes a micro-electro-mechanical system (MEMS) actuator having a first section and a second section. The first section is mounted to the housing, and the actuator is configured to rotate the second section relative to the first section in response to a voltage difference applied to the MEMS actuator. The second section has an aperture and a transmissive optical element is mounted in the aperture and attached to the second section, where the optical element is configured to be located in an optical path between the first window and the second window.

Various aspects, advantages, features and embodiments are included in the following description of examples thereof, which description should be taken in conjunction with the accompanying drawings. All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

DETAILED DESCRIPTION

Figure 1:
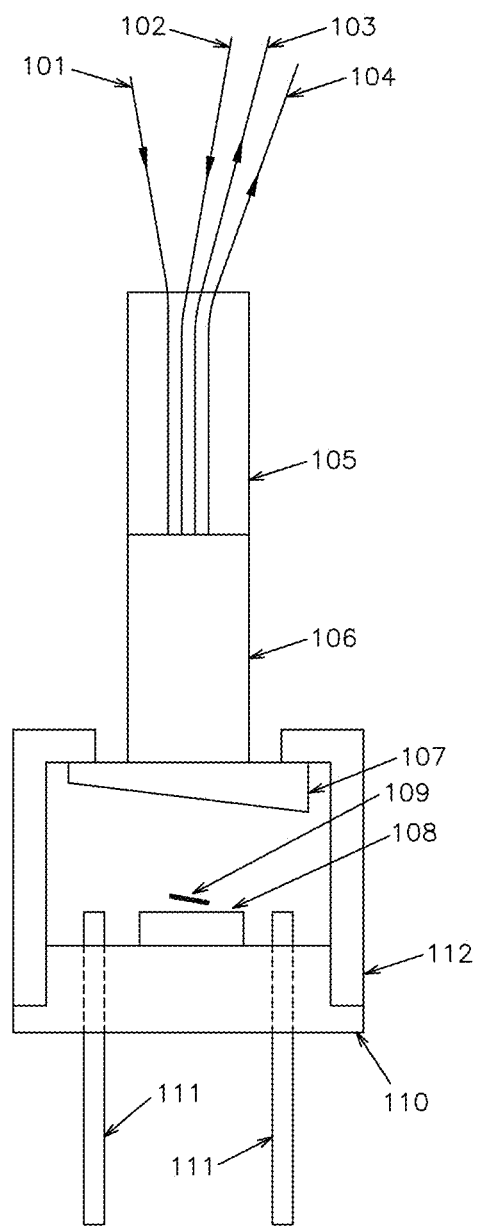
FIG. 1 illustrates a generalized optical component of the prior art, comprising a rotating MEMS tilt-mirror, one or more input fibers, and one or more output fibers.

The following presents a Micro-Electro-Mechanical Systems (MEMS) actuator that can rotate other, discrete optical elements that may be dimensionally large (especially in terms of thickness), may be of relatively large mass, and may be made of dissimilar materials (i.e., some material other than silicon). The rotating optical element may be reflective or transmissive. The MEMS actuator described herein can be used in a number of different embodiments, allowing the integration of multiple optical functions into a single optical component, for a variety of applications. These optical functions include optical switching, optical attenuation, tunable optical filtering, the adjustment of the phase angle of an optical signal, and the detection or receiving of an optical signal or optical power level.

MEMS device structures in general, and more particularly, tilting MEMS structures that use electrostatic actuation, have significant advantages for use in optical components, based on their small size and weight, and low power consumption, as well as the degree of precision and repeatability that can be achieved in their range of motion. MEMS device structures that are designed properly are highly reliable, and also offer relatively fast actuation, on the order of milliseconds, or tens of milliseconds, compared to other forms of mechanical actuation, such as stepper motors, solenoids, and relay-based actuators. MEMS devices are very effective when used as rotating tilt-mirrors, that are in turn used to steer optical beams, and to change the incident angle of said beams onto other optical elements. This is because it is relatively straightforward to create mirrors on the surface of silicon MEMS structures, via thin layers of gold and/or other metals. However, there are optical component applications where it would be desirable to use a MEMS device as an actuator for moving or rotating other optical elements, made from dissimilar materials (such as glass, and/or various dielectric materials), and with dimensions (especially thickness) and that are greater than that of a typical MEMS tilt-mirror. These optical elements may have a mass that is relatively large, in comparison to a MEMS tilt-mirror. In many cases, the fabrication of these optical elements may use very different processes, compared to the fabrication of typical MEMS structures, making it difficult to fabricate them "together" with the MEMS actuator, as a single, integrated device structure. In some cases, it may also be desirable to use a MEMS device as an actuator for moving or rotating optical elements that are transmissive in nature, such that light may pass through said optical element(s), to be incident upon some other optical element or device that lies underneath the moving or rotating element.

The examples presented in the following use a MEMS actuator that is used to rotate or tilt a discrete optical element that may be dimensionally large (especially in terms of thickness), may be of relatively large mass, and may be made of dissimilar material. The MEMS actuator is described in more detail below. The MEMS actuator and rotating optical elements of various kinds are used to implement a variety of integrated optical components, for a variety of optical networking applications. These optical components, comprising the MEMS actuator, a rotating or tilting discrete optical element, plus additional elements, represent examples of additional embodiments.

Figure 6:
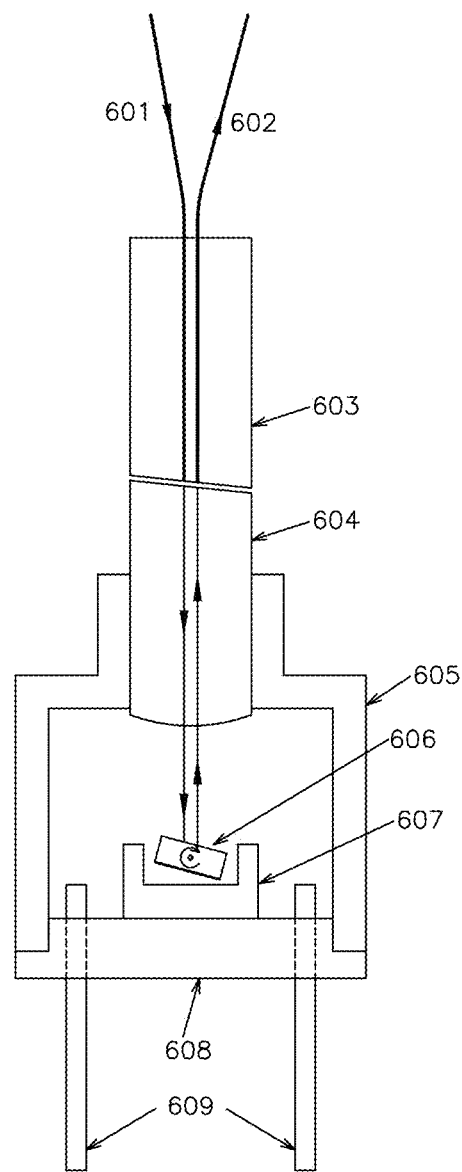
FIG. 6 shows one embodiment having a rotating MEMS actuator that rotates a reflective optical element, such as a reflection diffraction grating.

FIG. 6 shows one such embodiment in which a rotating MEMS actuator is used to rotate a discrete optical component, or element, made of a material that may be dissimilar to that of the MEMS actuator. The optical input and output ports are provided by a fiber ferrule 603 that holds an input fiber 601, and an output fiber 602. The input signal on input fiber 601 would typically comprise multiple wavelengths, each wavelength carrying its own information. Light exiting the input fiber 601 passes through collimating lens 604, forming a collimated beam. Note that there is a small air gap between the fiber ferrule 603 and the collimating lens 604, and their respective end faces are polished at a slight angle, to prevent back-reflection.

The collimated beam that emerges from lens 604 is directed at a rotatable optical element 606, for example, a reflection diffraction grating, that is rotated by MEMS actuator 607. Note that the rays shown in FIG. 6 and subsequent figures make no attempt to accurately depict the effect of optical elements such as the collimating lens, and are just intended to show the approximate optical path through the embodiment. The depiction of the MEMS actuator 607 is for illustration of the basic concept of this embodiment (and subsequent embodiments), and does not reflect the actual structure of the MEMS actuator. The rotational axis of the rotating optical element (for example, a diffraction grating) 606 is shown as being perpendicular to the page. In this embodiment, the diffraction grating 606 is attached in some way to the rotating or movable portion of the MEMS actuator 607, which has a rotational axis that is also perpendicular to the page.

MEMS actuator 607 would typically be fabricated from silicon, or some other material that is fabricated using semiconductor processing methods. However, the diffraction grating 606 would typically be made of glass. As such, the material of the diffraction grating 606 is dissimilar from that of the MEMS actuator 607, and the two elements would be fabricated separately. The thickness of the diffraction grating 606 is also substantially larger than the thickness of the mirror portion of typical MEMS tilt-mirror structures, and of relatively greater mass. Thus, the MEMS actuator 607 must be able to carry, and rotate, a relatively thick element, with relatively large mass, that is fabricated separately, and is attached to the MEMS actuator using some form of metallic bonding, or through the use of epoxy, or some other glue. The structure of the MEMS actuator, and the attachment of other optical elements to it, will be discussed in more detail, below.

The MEMS actuator is bonded or attached to a chip header 608, typically via a metallic bonding process, or by using a die-attach glue, which may be an electricallyconductive epoxy. The housing 605 serves to hold lens 604 in place, and is also bonded or welded to the chip header 608, forming a seal around the MEMS actuator and the rotating optical element that provides protection from environmental conditions.

The chip header's electrical pins, 609, are used to bring one or more control voltages, as well as an electrical ground connection, to the MEMS actuator 607. Typically, wire bonds would be used to provide electrical connections from the tops of the pins, 609, to electrical contacts or pads on the fixed portion of the MEMS actuator. The MEMS actuator shown in FIG. 6 and subsequent figures is depicted as having a single axis of rotation, which would require at least two electrical contacts, comprising a single control voltage and electrical ground connection(s). However, other embodiments might use a MEMS actuator with two axes of rotation, and/or bi-directional tilting of the one or more axes, and so the number of electrical connections could be as high as five, or even greater (such as in the case of having two axes of rotation, with bi-directional tilting of both axes, requiring four control voltages plus one or more ground connections).

In the embodiment shown in FIG. 6, the diffraction grating 606 is depicted as being a reflection grating, such that the dispersed wavelengths are reflected back towards the lens 604. Based on the design of the grating, and the wavelengths that are present on the input signal, the sub-assembly of the MEMS actuator 607 and the diffraction grating 606 may need to be mounted at some angle, relative to the incident light, such that the reflected, dispersed wavelengths are directed back at the lens 604. Then, based on the additional rotation provided by the MEMS actuator 607, a selected wavelength will be coupled to the output fiber 602.

Figure 7:
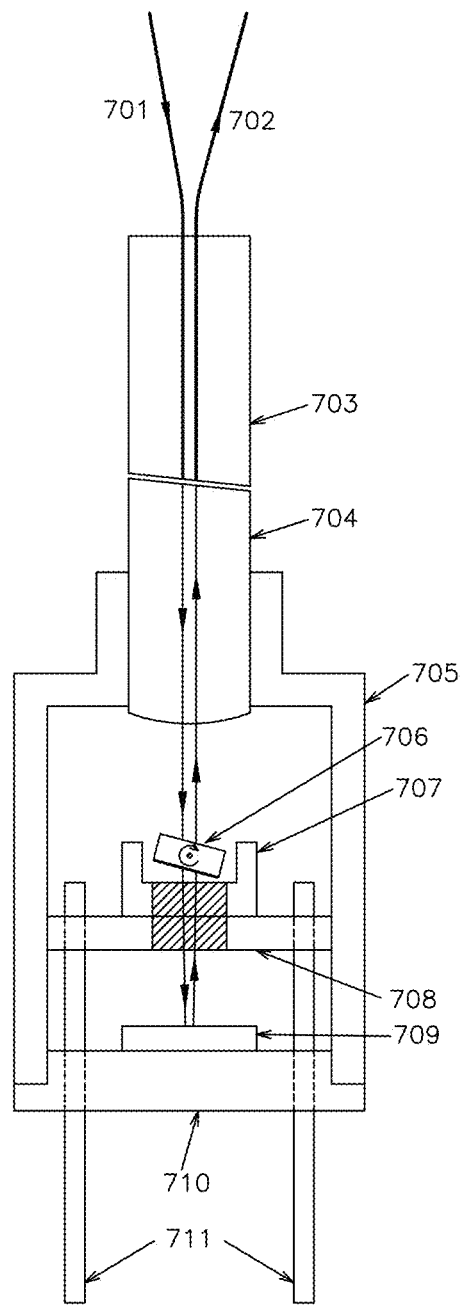
FIG. 7 shows another embodiment, including a rotating MEMS actuator that rotates a transmissive optical element, such as a transmission optical grating, or a thin-film optical filter chip.

Another embodiment is shown in FIG. 7. The basic structure of this embodiment is similar to the embodiment shown in FIG. 6. However, in the embodiment of FIG. 7, the rotating optical element is a transmissive optical element, such as a transmission diffraction grating, or a thin-film optical filter. The optical input port and optical output port are again provided by a fiber ferrule 703 that holds an input fiber 701, and an output fiber 702. Multi-wavelength light coming in on input fiber 701 is collimated by lens 704, and the resulting beam is incident on rotating optical element 706, which is rotated by MEMS actuator 707. Light that passes through the transmissive optical element 706, also passes through holes or apertures in both the MEMS actuator 707, and the underlying chip header 708. These holes are indicated in FIG. 7 by the cross-hatched areas of MEMS actuator 707 and chip header 708. The light that passes through these holes is then reflected by the fixed mirror 709, which is mounted on its own header 710. After passing through the rotating optical element a second time, the light is focused by lens 704 onto output fiber 702.

If the rotating optical element 706 is a transmission diffraction grating, then it will spatially disperse the multiple wavelengths of the input signal. Based on the angle of the grating, a specific wavelength or range of wavelengths will be coupled onto the output fiber. Similarly, if the rotating optical element is a thin-film optical filter, then a specific wavelength or range of wavelengths will be passed through the thin-film optical filter, to be coupled onto the output fiber, depending on the angle of rotation of the thin-film optical filter. Electrical pins 711 are used to bring the necessary control voltage(s) to the MEMS actuator 707, as well as electrical ground, passing through both the outer header 710, as well as the MEMS chip header 708. The pins are sealed to the outer header 710, but may simply pass through the MEMS chip header 708. Typically, wire bonds would be used between the tops of the pins 711, to electrical contacts or pads on the fixed portion of the MEMS actuator 707.

Although not shown in FIG. 7, if the optical element 706 is a diffraction grating, then it may be necessary to mount the MEMS actuator 707 at some angle with respect to the incident light, or, alternatively, to position mirror 709 at an angle, such that the dispersed wavelengths coming out of the grating are reflected back through the grating, and directed toward the lens 704. Then the additional tilting or rotation of the MEMS actuator and the grating will serve to select a specific wavelength or range of wavelengths.

If the optical element 706 is a thin-film filter, the filter will be designed to pass a specific wavelength or range of wavelengths when the filter chip is perpendicular to the incident beam. The thin-film filter may be a single-cavity Fabry-Perot filter, or a multi-cavity filter with flatter pass-band characteristic, or any other form of thin-film optical filter. Such filters are fabricated by the deposition of multiple layers of dielectric material onto a substrate, typically made of glass. Future references to thin-film filters, or to thin-film filter chips, may be understood to refer to the entire structure, including both the layers of dielectric material, as well as the underlying substrate. Tilting or rotating the filter chip, including the actual filter structure, via rotation of the MEMS actuator 707, will shift the passed wavelength or range of wavelengths to a longer wavelength or range of wavelengths. However, the amount of wavelength shift per degree of rotation may not be that great, when the filter chip is close to being perpendicular to the incident beam. The amount of wavelength shift per degree of rotation can be increased, by mounting the MEMS actuator 707 at some angle with respect to the incident beam. For example, if the total range of motion of the MEMS actuator 707 is five degrees, and the MEMS actuator is mounted at an angle of 15 degrees with respect to the perpendicular of the incident beam, then the effective angle of the thin-film filter chip will be 15-20 degrees with respect to the incident beam, rather than 0-5 degrees. This "pre-tilt" will result in a greater effective wavelength tuning range. (Note that FIG. 8 shows an embodiment in which the MEMS actuator is mounted at an angle, as discussed further below.)

In the embodiment shown in FIG. 7, light passes through the rotating optical element twice, effectively filtering or diffracting the light twice. Although not shown in FIG. 7, other embodiments are possible, in which the light only passes through the rotating optical element 706 once, either before or after being reflected by fixed mirror 709. This would require a somewhat different configuration of the location and structure of the other elements of the embodiment, such as the MEMS actuator 707 and its header 708. Similarly, although the embodiments of FIGS. 6 and 7 make use of a single fiber ferrule, containing both an input fiber and an output fiber, other embodiments are possible in which the input fiber(s) and output fiber(s) are held in separate ferrules, with some degree of spatial separation. In other embodiments, the rotating optical element can be something other than a diffraction grating or thin-film filter chip. As one example, if the rotating optical element is a slab of glass, then rotation of the slab will result in lateral displacement of the optical beam, which could be used to provide attenuation of the optical signal.

Figure 8:
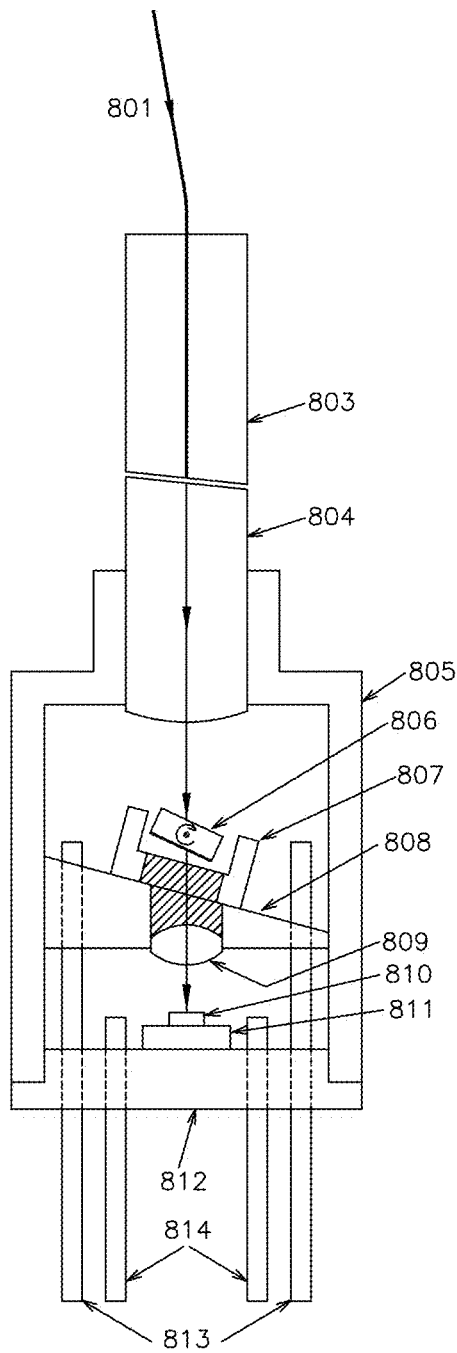
FIG. 8 shows another embodiment, comprising a rotating MEMS actuator that rotates a transmissive optical element, such that light is coupled to a photodetector device.

Another embodiment is shown in FIG. 8, comprising both a rotating optical element, as well as a photodetector, integrated into a single optical component that performs the function of a tunable optical signal detector, or optical power detector. In this embodiment, there is a single input fiber 801, held in place by fiber ferrule 803, and no output fiber. Typically, as in other embodiments, the input light will consist of multiple wavelengths, with each wavelength carrying its own information. The light emitting from the optical input port of the input fiber 801 is collimated by lens 804, and directed to the rotating optical element 806. This rotating optical element could be a transmission diffraction grating, or it could be a thin-film optical filter. The rotating optical element 806 is mounted to MEMS actuator 807, which in turn is mounted on a chip header 808.

The embodiment shown in FIG. 8 makes use of an angled chip header or mounting 808, for the MEMS actuator 807. The angled mounting may be necessary if the rotating optical element is a diffraction grating. If the rotating optical element is a thin-film filter chip, the application of a "pre-tilt" to the MEMS actuator and the rotating optical element will serve to increase the effective wavelength tuning range, for a given range of tilting or rotating motion from the MEMS actuator, as discussed above.

The base of the MEMS actuator 807, and the angled chip header 808, both have holes or openings in them, indicated by the cross-hatched areas, so that light passing through the rotating optical element can also pass through the holes. If the rotating optical element is a diffraction grating, then the light passing through the holes will be spatially dispersed, with different wavelengths having different exit angles from the diffraction grating. If the rotating optical element is a thin-film filter, then the light passing through the holes will be of a particular wavelength, or range of wavelengths. In the embodiment of FIG. 8, a focusing lens 809 is affixed to the underside of chip header 808, or in the hole that is formed in chip header 808. This lens can be of various forms, including various forms of convex lenses, or a ball lens, or a cylindrical lens, or a Graded-Index (GRIN) lens. The lens 809 focuses the beam onto photodetector 810, which is mounted on its own chip header or substrate 811, or it may be directly mounted onto the base header of the overall structure, 812. If the rotating optical element is a diffraction grating, then only a portion of the spatially dispersed wavelengths will be aligned to hit the photodetector, based on the tilt-angle of the MEMS actuator. In this case, the wavelength selectivity of the photodetection function is determined in part by the dimensions of the photodetector chip 810. If the rotating optical element is a thin-film filter, then the wavelength of the light that hits the photodetector is determined by the tilt-angle of the MEMS actuator and the rotating thin-film filter chip itself, and so the dimensions of the photodetector chip 810 are less critical, in terms of wavelength selectivity.

Electrical pins 813 are used to provide the control voltage(s) and ground connection to the MEMS actuator 807, typically by using wire bonds from the tops of pins 813, connected to electrical pads or contacts on the MEMS actuator 807. As in other embodiments, the MEMS actuator may have a single axis of rotation, or two axes of rotation, and the tilting of the structure may be in one direction only, or bi-directional. Depending on the specific design of the MEMS actuator, the number of electrical connections may be as few as two, and as many as five, or even more. Electrical pins 814 are intended to provide electrical connections to photodetector 810, which would typically be a reverse-biased PIN photodiode, or an avalanche photodiode (APD). Electrical pins 814 are then used to connect the photodetector to external electronic circuitry, such as a Trans-Inductance Amplifier (TIA) circuit, or some other form of circuit providing electrical amplification of the current generated by the photodetector, when exposed to light. All of the electrical pins, 813 and 814, are held in place by the base header 812, such that the combination of the base header 812, the outer housing 805, and the lens 804 are providing a good seal, protecting the MEMS actuator 807 and other elements from environmental conditions, such as moisture and humidity.

In another variation of the embodiment shown in FIG. 8, a Trans-Inductance Amplifier (TIA), or other form of amplifier circuit that is used to electrically amplify the current generated by the photodetector, is packaged within the structure of the embodiment. Referring to FIG. 8, in this additional embodiment, the chip header or substrate 811 can contain the photodetector 810, as well as its associated TIA or other amplifier device, and any other associated passive electronic components (i.e. resistors and/or capacitors required by the TIA or other amplifier chip). Electrical interconnections between the photodetector 810 and these additional electronic components can be provided by electrical routing traces on the chip header or substrate 811. In this embodiment, additional pins 814 are needed, to bring electrical power to the electronic components that are mounted on chip header or substrate 811, and also to bring out the amplified electrical representation of the received optical signal.

Figure 9:
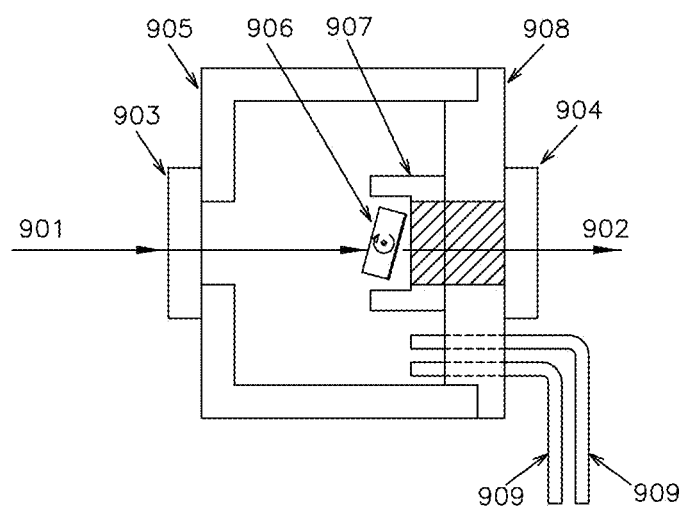
FIG. 9 shows another embodiment, in which a slab of dielectric material is rotated, in order to introduce a phase shift, or delay, in an optical signal.

FIG. 9 shows another embodiment that is intended to adjust the phase angle or delay of an optical signal. In FIG. 9, the embodiment lies in the path of an optical beam, in free space. One skilled in the art will realize that other embodiments, such as using fiber-coupled optics, can also be implemented. The embodiment shown in FIG. 9 is based on the principle that the delay experienced by an optical signal, as it passes through a dielectric material, can be adjusted by physically varying the length of the optical path through the material. As such, the rotating optical element, in the embodiment of FIG. 9, is a rotating slab of dielectric material. The ability to adjust or vary the delay experienced by an optical signal, and thus its phase angle, with respect to the original signal, is useful in the design and implementation of advanced coherent optics transmitters, receivers, and transceivers. On the transmission side, the device is used to adjust the phase of the optical signal entering the network, so that it can be combined with other optical signals at different phase angles. On the receive side, it is used to adjust the phase angle of the received optical signal, and its interference with a local laser oscillator.

Light entering the device structure of FIG. 9, labeled as 901, passes through an optical input port of an optically transparent window 903, that has been bonded or sealed to housing 905. The light passes a rotating slab of dielectric material 906, that is bonded or attached to MEMS actuator 907, as in the previous embodiments. Light that exits the slab of dielectric material then passes through holes in the base of MEMS actuator 907, and chip header 908. In this embodiment, the light then exits the device structure through an optical output port of another optically transparent window 904, that has been bonded or sealed to the chip header 908. In this embodiment, the electrical pins 909 are shown as being on one side of the chip header 908, so that they are not in the path of the optical signal as it exits the device structure. However, other arrangements of the electrical pins 909 and their electrical connections to the MEMS actuator are possible, as long as there is no blocking of the optical path. As stated above, other variations of this embodiment are possible, such as those in which the incoming light and/or the outgoing light are fiber-coupled to the device structure.

Figure 10:
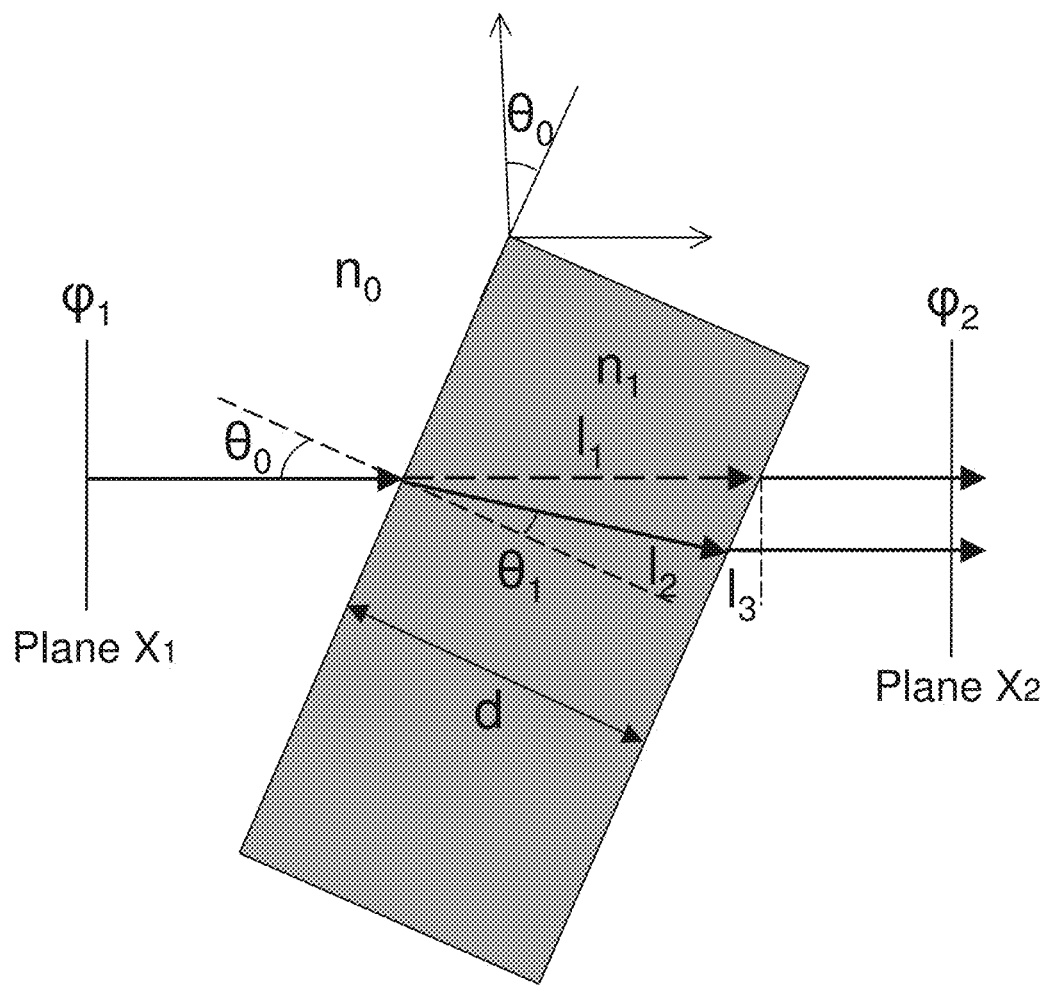
FIG. 10 illustrates the principle of operation of the embodiment shown in FIG. 9.

FIG. 10 illustrates the principle of operation of the embodiment shown in FIG. 9. An optical plane wave with initial phase angle $\varphi_1$, at a plane X1 in free space, enters the slab of dielectric material at an incident angle of $\theta_0$. The index of refraction of the dielectric material is shown as $n_1$, whereas the index of refraction of the surrounding air or atmosphere is shown as $n_0$. The thickness of the dielectric slab, perpendicular to its top and bottom surfaces, is shown as d. The straight-line distance through the rotated slab, in the absence of refraction, is represented by $l_1$. In accordance with Snell's Law, $$n_0 \sin \theta_0 = n_1 \sin \theta_1.$$

The length of the actual optical path through the dielectric slab is shown as $l_2$, and the difference in path length between the horizontal component of path $l_2$ and the straight-line path $l_1$ is shown as $l_3$ (as depicted graphically in FIG. 10). The phase of the optical plane wave that exits the dielectric slab is represented by $\varphi_2$, at a Plane X2 in free space.

The phase delay or phase angle shift with respect to air or vacuum that is caused by an inclined thin dielectric slab is calculated using the following equation, in which $\Delta\varphi = \varphi_2 - \varphi_1$:

$$\Delta\varphi = (2\pi/\lambda)(n_1 l_2 + n_0 l_3 - n_0 l_1), \text{ where}$$

$$l_1 = d/\cos\theta_0,$$

$$l_2 = d/\cos\theta_1, \text{ and}$$

$$l_3 = d(\tan\theta_0 - \tan\theta_1)\sin\theta_0.$$

Therefore, $\Delta\varphi$ can be varied by rotating the dielectric slab (i.e., changing the incident angle to the dielectric slab). Thus the phase $\varphi_2$ at Plane X2 is adjusted or tuned when the slab is rotated to a different angle.

Figure 11A:
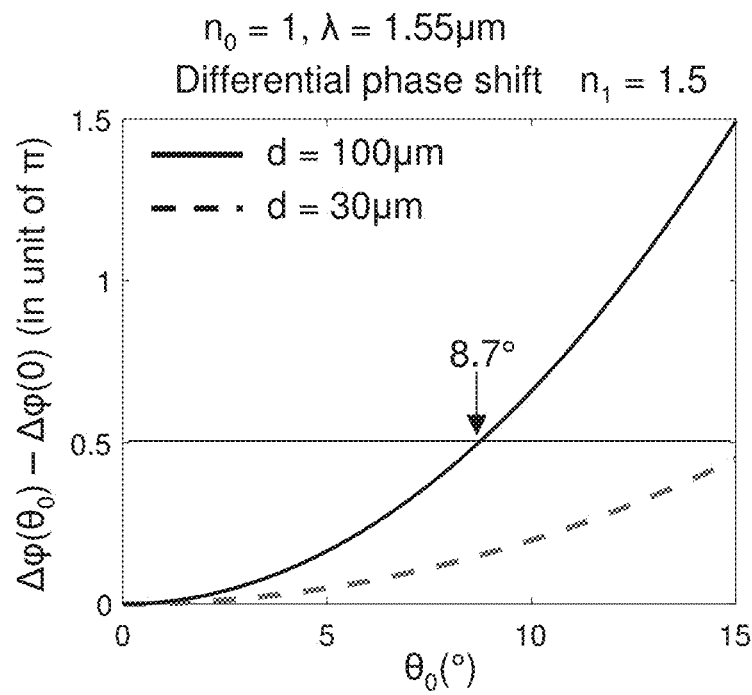
FIGS. 11A and 11B provide calculated values for the phase shift, or delay, that is imparted to the optical signal, as a function of the rotational angle of a slab of dielectric material that lies in the optical path.
Figure 11B:
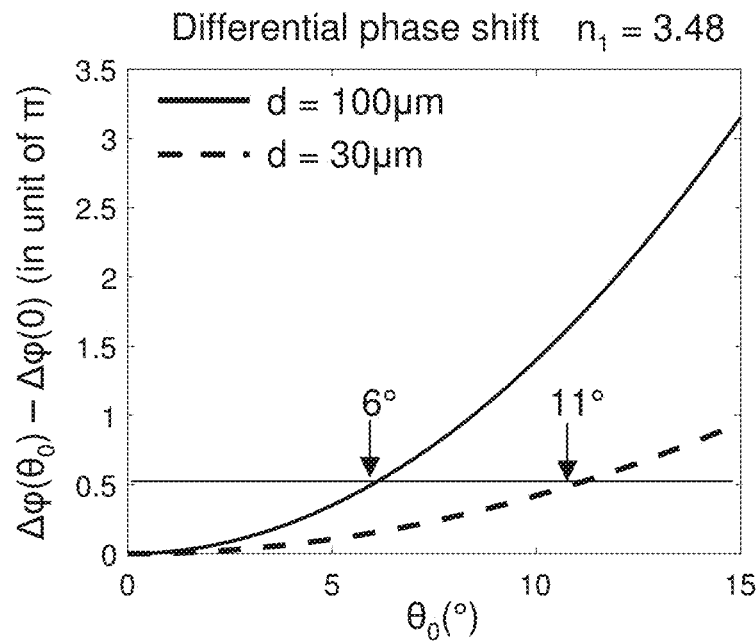

FIGS. 11A and 11B show some sample calculations based on the above equations, showing the amount of phase angle adjustment that results from different rotational angles of a slab of dielectric material, using several representative values for the thickness of the dielectric slab, and its index of refraction. In both plots, the index of the ambient air or atmosphere is assumed to be 1, and the wavelength of the optical signal is 1.5 µm, or 1550 nm.

The plots shown in FIG. 11A shows the amount of differential phase shift as a function of the incident angle, with respect to zero incident angle, for dielectric slabs of a material with an index of refraction of 1.5, which is representative of many types of glass. The dashed-line plot is for a dielectric slab with a thickness of 30 µm, and the solid-line plot is for a dielectric slab with a thickness of 100 µm. The vertical axis of the plot, representing the differential phase shift, is in units of $\pi$ (pi). The horizontal line is at $\pi/2$, or 90 degrees, which would be a typical amount of phase shift needed in many coherent optics implementations. As would be expected, a thicker dielectric slab will produce greater phase shift, at a given angle of rotation. The plot in FIG. 11A indicates that a rotation angle of 8.7 degrees from zero incident angle is needed to produce 90 degrees of phase shift, assuming that the dielectric slab has an index of refraction of 1.5.

A rotation angle of 8.7 degrees might be beyond the capability of the MEMS actuator structure. In order to reduce the required angle of rotation, dielectric materials with higher index of refraction may be used, including a variety of semiconductor materials. FIG. 11B shows the phase shift that results from rotating a slab of dielectric material with an index of refraction of 3.48, which is representative of silicon. For both representative slab thicknesses, the required angle of rotation to achieve 90 degrees of phase shift has been significantly reduced.

The amount of rotational angle required can also be reduced by applying a "pre-tilt" to the dielectric slab. This can be achieved by mounting the MEMS actuator onto a tilted chip header, so that the "at rest" MEMS actuator is already at some initial angle with respect to the incident optical beam, similar to the embodiment shown in FIG. 8. This will result in greater phase angle shift as a function of the rotational angle of the MEMS actuator, relative to the phase angle shift that exists when the MEMS actuator is in its "at rest" position. For example, using the dielectric slab parameters of FIG. 11A, with an index of refraction of 1.5 and a slab thickness of 100 µm, the use of 6 degrees of "pre-tilt" of the MEMS actuator results in the rotational angle requirement being reduced from 8.7 degrees to 4.6 degrees, in order to achieve 90 degrees of phase shift adjustment. Similar improvement is obtained when using the dielectric slab parameters of FIG. 11B, with an index of refraction of 3.48, and a slab thickness of 100 µm. In this case, 6 degrees of "pre-tilt" of the MEMS actuator results in the rotational angle requirement being reduced from 6 degrees to 2.5 degrees. Additional "pre-tilt" will reduce the rotational angle requirements for the MEMS actuator further, and lesser amounts of "pre-tilt" will of course result in less improvement. The use of "pre-tilt" will introduce some amount of "initial" phase shift or delay, compared to an optical signal that is not passing through the structure. Higher tilt angles will also increase the level of Polarization Dependent Loss (PDL), and will also increase the lateral displacement of the optical beam. These effects may or may not matter, depending on the specific application, as well as the overall device structure.

It should be noted that if the rotating slab of dielectric material is made of silicon, and if the designed thickness of the slab is fairly small, such as 30 or even less, then the rotating slab could in principle be fabricated as an integral part of the MEMS actuator structure. This structure would be essentially the same as a MEMS tilt-mirror structure, except that the "mirror" surface would be left uncoated by gold or other metals. As such, the rotating MEMS "mirror" would be a rotating silicon slab. However, in the more general case, the rotating dielectric slab will either be of greater thickness, or will be made of some dissimilar material, and will therefore be fabricated separately from the MEMS actuator. Also, even if the rotating dielectric slab is made of silicon, there may be other processing steps that make it necessary or desirable to fabricate the dielectric slab separately from the MEMS actuator, such as polishing of the slab's top and bottom surfaces, or the use of anti-reflective (AR) coatings.

FIGS. 12 and 13 show various views of a MEMS actuator in simplified form. The MEMS actuator shown in these figures is one that has a single axis of rotation. In other embodiments, the actuator could have two axes of rotation, with the second axis typically being orthogonal to the first axis. In the case of a MEMS actuator with two axes of rotation, one axis would be used for the primary wavelength tuning function, or the primary tilting/rotating function. The other axis could be used for making fine adjustments to the optical alignment of the various elements in the overall structure, or alternatively, for implementing a separate optical function, such as switching between multiple input fibers, or between multiple output fibers. The tilting or rotating motion of the MEMS actuator can be in one direction only, from its rest position, or the MEMS actuator may be capable of bidirectional tilting, depending on the design of the MEMS actuator chip. Depending on these variables, the number of distinct control voltages that may be needed can range from a single control voltage, to as many as four control voltages, or even more, with respect to the MEMS actuator's electrical ground connection.

Figure 12A:
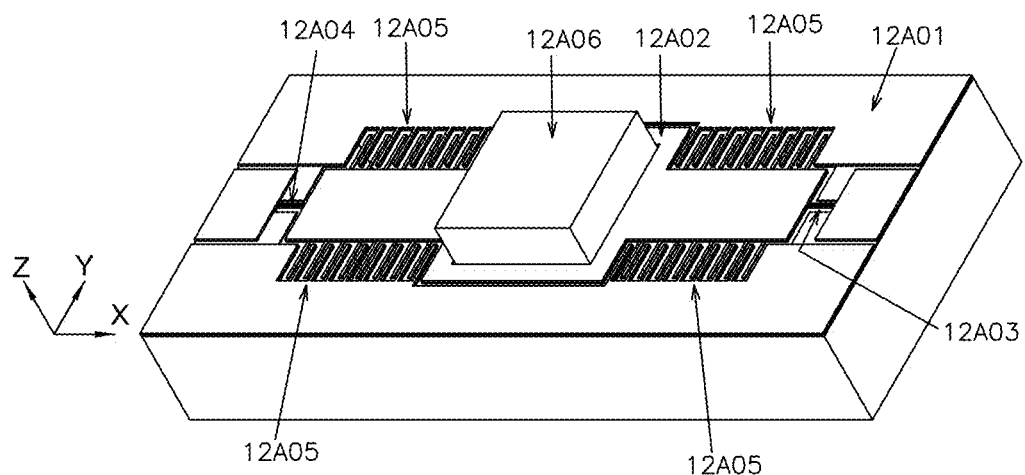
FIG. 12A and FIG. 12B show perspective views of an example of a MEMS actuator.

In FIG. 12A, the outer frame of the MEMS actuator, 12A01, is fixed in relation to the attachment of the MEMS actuator to its chip header. The rotating or tilting portion of the MEMS actuator is represented by 12A02. The connections between the rotating portion and the fixed portion are via torsion beams 12A03 and 12A04, which also provide the spring force that serves to hold the rotating portion of the MEMS actuator at its rest position, in the absence of applied voltage(s). The torsion beams 12A03 and 12A04 also define the intended axis of rotation of the moving portion of the structure. The actuating or tilting force is applied by a series of interlaced comb fingers, as indicated by the multiple 12A05 labels. These comb finger actuators make use of electrostatic force, as described in U.S. Pat. No. 6,838,738. Half of the interlaced comb fingers are attached to the fixed portion of the MEMS actuator 12A01, and the other half of the interlaced comb fingers are attached to the rotating portion of the MEMS actuator, 12A02. When a voltage difference is applied across the two sets of comb fingers, the resulting electrostatic force serves to rotate or tilt the rotating portion of the structure.

The rotating optical element that is being rotated by the MEMS actuator is shown as 12A06. Since this optical element is fabricated separately from the MEMS actuator, and is usually of a dissimilar material, it would be affixed to the rotating portion 12A02 of the MEMS actuator, using a metallic bonding process, or by using epoxy, or some other form of glue. Typical dimensions of the rotating optical element 12A06, when it is a thin-film filter chip, would be on the order of 0.7 mm (i.e., 700 µm) by 0.7 mm, with a thickness that is on the order of 0.4 mm. With other types of rotating optical elements, the dimensions could be somewhat larger, or smaller, but would still be similar, or comparable. As such, the thickness of the rotating optical element is usually substantially greater than the thickness of the rotating portion 12A02 of the MEMS actuator, which is on the order of tens of µm.

Figure 12B:
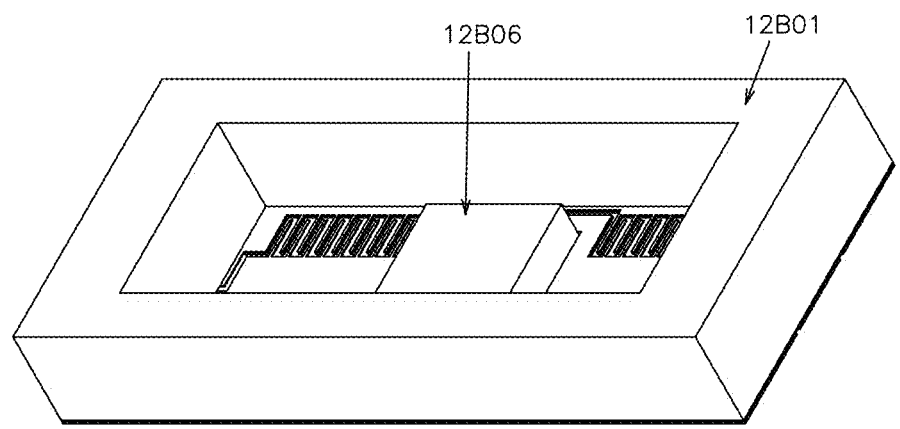

FIG. 12B shows the underside of the MEMS actuator 12B01, showing the underside of the rotating optical element 12B06. Note that the rotating optical element (shown as 12A06 and 12B06) is fitted into a hole or opening in the rotating portion 12A02 of the MEMS actuator. Note also that the underside of the overall MEMS actuator structure is basically open as well, so that light can pass through the rotating optical element and also the MEMS actuator structure itself.

Figure 13A:
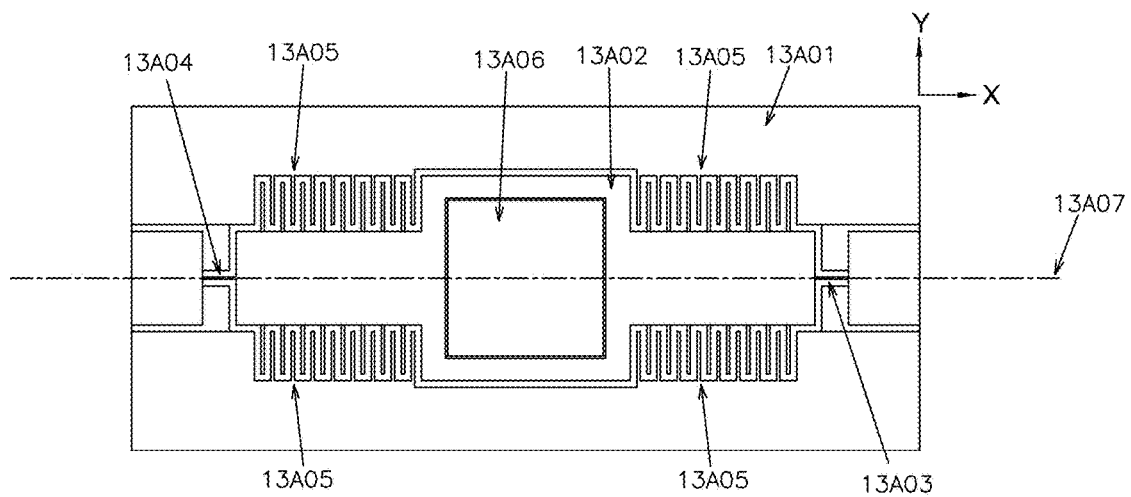
FIG. 13A and FIG. 13B show a top view, and a cross-section view, of an example of a MEMS actuator.
Figure 13B:
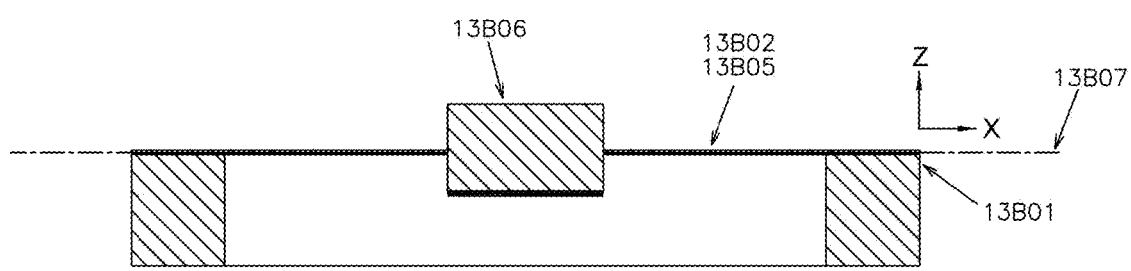

FIG. 13A shows a top view of the MEMS actuator shown in FIGS. 12A and 12B, with label numbers that correspond to the labels used in FIG. 12A. The X, Y, and Z-axis labels shown in FIGS. 13A and 13B correspond to the axis labels shown in FIG. 12A. In FIG. 13A, the single rotational axis of the MEMS actuator is shown as 13A07, which coincides with the torsion beams, and is parallel to the X-axis label. (Note that if the MEMS actuator had two axes of rotation, the other axis would be parallel to the Y-axis label.) FIG. 13B shows a side or cross-section view of the MEMS actuator, taken along a cut line that corresponds to the rotational axis 13A07. In FIG. 13B, 13B01 indicates the fixed portion or outer frame of the MEMS actuator, and 13B06 indicates the rotating optical element, in cross-section. The rotational axis is shown as 13B07. The relatively thin parts of the MEMS actuator structure, shown as 13B02 and 13B05, represent the rotating portion of the MEMS actuator, and the comb finger actuators, respectively.

In the cross-section view of FIG. 13B, the rotational axis of the MEMS actuator is essentially lined up with the thin parts of the structure, as indicated by 13B02 and 13B05. The rotating optical element, as indicated by 13A06 and 13B06, is centered on the rotational axis of the MEMS actuator structure, in all planes, or more precisely, the center of mass of the rotating optical element should be centered on the rotational axis, in all planes. If the rotating optical element had near-zero mass, then it might be preferable for the top surface of the rotating element to be essentially "flush" with the top surface of the MEMS actuator, to minimize lateral movement or displacement of the top surface of the rotating optical element, during rotation. However, given the relatively large mass of practical or typical rotating optical elements, related to the mass of the MEMS actuator itself, the example embodiments place the center of mass of the rotating optical element such that it is aligned with the rotational axis, or axes, of the MEMS actuator structure, in all planes. This will minimize the effect of external forces on the desired rotational angle of the MEMS structure, and the rotating optical element. These external forces could include external shock and vibration forces, as well as the force of gravity. This arrangement allows for the rotational angle of the structure to be essentially immune to external forces that are basically linear in nature.

Figure 2A:
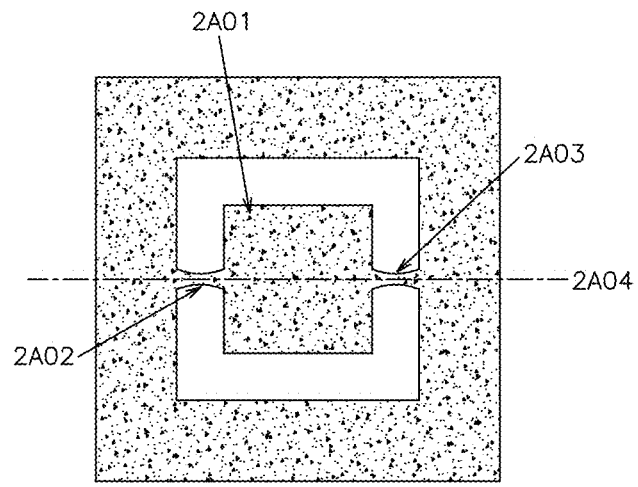
FIGS. 2A and 2B show functional representations of a prior art embodiment of a rotating MEMS tilt-mirror with a single axis of rotation.
Figure 2B:
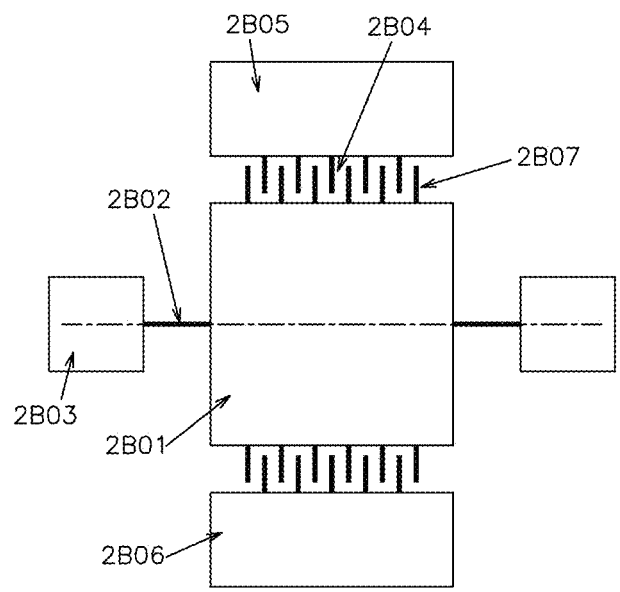
Figure 3:
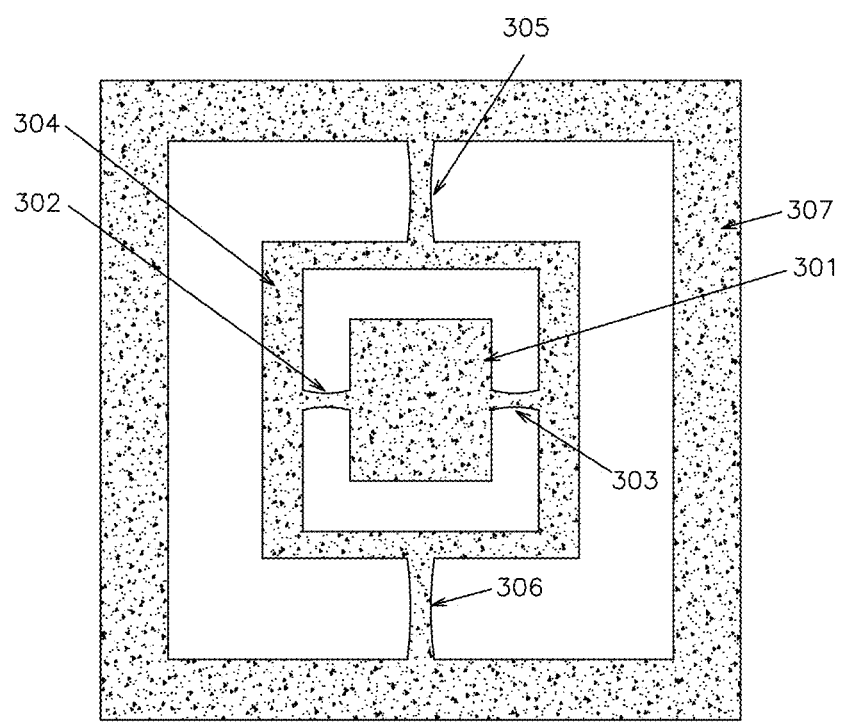
FIG. 3 shows a functional representation of a prior art embodiment of a rotating MEMS tilt-mirror with two axes of rotation.
Figure 4:
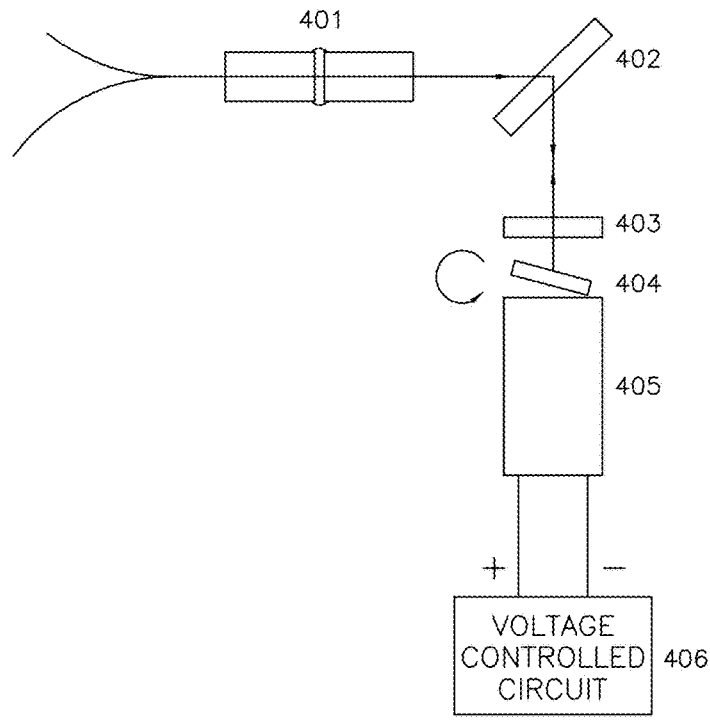
FIG. 4 shows a functional representation of a prior art embodiment of a tunable optical filter, comprising a fixed diffraction grating and a rotating MEMS tilt-mirror.
Figure 5:
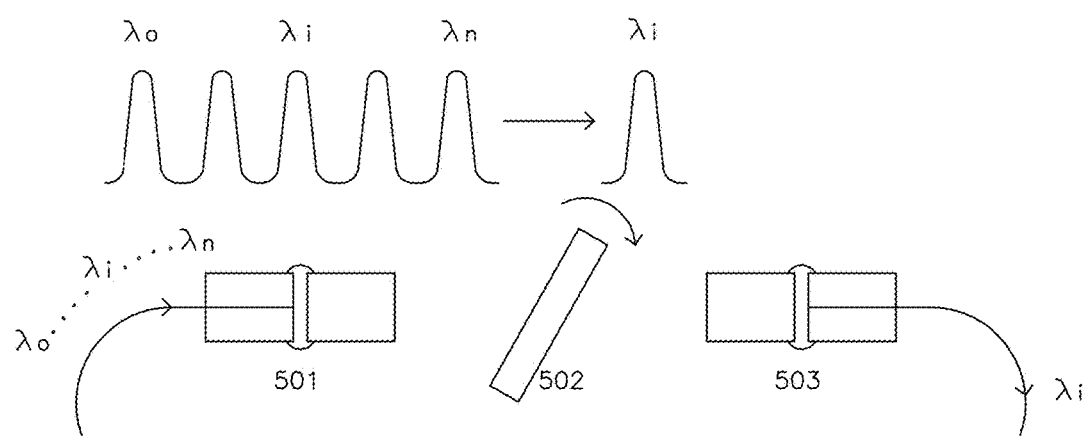
FIG. 5 shows a prior art embodiment of a tunable optical filter, comprising a rotating thin-film filter chip.

In principle, it is possible to mount the rotating optical element on top of the rotating portion of the MEMS actuator, instead of setting the rotating optical element down into a hole or aperture in the MEMS actuator, as shown in FIGS. 2 and 13. As one example, this form of alternative structure would allow the mounting of a rotating optical element on top of a MEMS tilt-mirror. However, the resulting structure would not be mass-balanced around its rotational axis or axes, making it impractical for many applications.

The torsion beams of the MEMS actuator are designed to resist any non-rotational movement of the moving portions of the actuator, as well as the attached rotating optical element and its mass. This includes movement that is in the plane of the MEMS actuator structure (i.e. movement along either the X-axis or the Y-axis, as shown in FIGS. 12A and 13A), as well as out-of-plane motion (i.e. movement along the Z-axis, as shown in FIGS. 12A and 13B). If the center of mass of the rotating optical element is not aligned with the rotational axis, then the rotating of the mirror will create non-rotational forces that may result in in-plane or out-of-plane motion. One way to think of this, imprecisely, is that if the rotating optical element is not "balanced" with respect to the rotational axis, then these non-rotational forces may result in various forms of "wobbling" of the rotating optical element, as well as the rotating portion of the MEMS actuator. For example, the rotating portion of the structure, including the rotating optical element as well as the rotating portion of the MEMS actuator, may move slightly along the Y-axis. It may also twist slightly (i.e., rotate around the Z-axis), or it may move slightly up and down, along the Z-axis.

It is important to prevent inadvertent contact between the interleaved comb fingers, as the adjacent fixed and moving comb fingers are at a different electrical potential. For similar reasons, the comb finger structures of the MEMS actuator are designed such that the electrostatic force provided by the comb fingers is balanced around the rotational axis, with minimal in-plane and out-of-plane components. Alignment of the center of mass of the rotating optical element with the intended rotational axis of the structure (i.e., the axis defined by the torsion beams) insures that inertial forces associated with rotation of the rotating optical element do not result in in-plane or out-of-plane motion of the moving portions of the overall structure. The tensile strength of the torsion beams serves to minimize motion along the X-axis. The torsion beams have a dimension in the Z-axis direction that is on the order of ten times their dimension in the Y-axis direction, and this serves to minimize movement along the Z-axis. The torsion beams are somewhat more susceptible to motion along the Y-axis, or in-plane twisting motion (i.e., movement in the positive Y-axis direction at one torsion beam, and movement in the negative Y-axis direction at the other torsion beam), but even in this case the tensile strength of the torsion beams will minimize the amount of motion. In short, the MEMS actuator design, and the alignment of the center of mass of the rotating optical element along the intended rotational axis, serve to ensure that the only force(s) that act on the rotating element are rotational, and that the movement of the rotating element and the rotating portion of the MEMS actuator is entirely rotational, and unaffected by any non-rotational external or inertial forces.

The resonant frequency of the moving structure is another important design consideration. In the absence of significant damping forces, or friction, the resonant frequency of a mass that is suspended by torsion springs is given by the following equation:

$$\omega = (\kappa/I)^{1/2},$$

where: $\omega$ is the resonant frequency in radians/second,
$\kappa$ is the spring constant of the torsion beams, and
I is the moment of inertia of the rotating mass about the axis of rotation.

Compared with a typical MEMS tilt-mirror of the prior art, the greater mass of the MEMS actuator and its rotating optical element of the embodiments will lead to a significantly reduced resonant frequency. MEMS tilt-mirror devices of similar design and dimensions have resonant frequencies that are typically in the range of 1,000 Hz. to 2,000 Hz. Due to the significantly greater mass of the rotating optical element, compared to a typical MEMS mirror structure, the moment of inertia I of the rotating portion of the MEMS actuator and the rotating optical element is substantially higher than the moment of inertia I of a comparable MEMS tilt-mirror. In order to maintain a resonant frequency that is greater than 1,000 Hz., or ideally even higher, the spring constant $\kappa$ of the torsion beams must be designed to be proportionally greater. The stiffer torsion beams are also beneficial to minimizing non-rotational motion, as described above. However, as a result of the torsion beams being stiffer, greater electrostatic force is needed to achieve similar tilt angles. This in turn requires the use of more comb fingers, or higher applied voltage difference across the interleaved comb fingers, or both.

If the rotating optical element is a thin-film filter chip, then the actual filtering of light is effected by multiple thin layers of dielectric material, that have been deposited onto a glass substrate. In the cross-section view of FIG. 13B, the implied shape and dimensions of rotating optical element 13B06 include both the dielectric layers and the filter chip's substrate, and most of the size and mass of the rotating optical element are a result of the substrate. In principle, the thin-film filter chip could be mounted with the dielectric layers either on the top side, or on the bottom side, with relatively minor effects on the functional performance of the overall structure.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

It is claimed:

1. An optical device comprising:
    a micro-electro-mechanical system (MEMS) actuator having a first section and a second section, wherein the actuator is configured to rotate the second section relative to the first section in response to a voltage difference applied to MEMS actuator, wherein the second section has an aperture;
    an optical element formed separately from the MEMS actuator, located in the aperture and attached to the second section; and
    an optical input port configured to hold in place an optical fiber to provide light incident on the optical element.

2. The optical device of claim 1, wherein the optical element is reflective.

3. The optical device of claim 2, wherein the optical element is a reflection diffraction grating.

4. The optical device of claim 3, wherein the diffraction grating is made of glass.

5. The optical device of claim 2, further comprising:
    a ferrule, wherein the optical element is in an optical path from the optical input port to a second optical port, the optical input port and the second port being housed in the ferrule.

6. The optical device of claim 5, wherein the optical input port and the second port are each an end of a corresponding optical fiber.

7. The optical device of claim 1, further comprising:
    a lens, the lens configured to collimate light from the optical input port incident on the optical element.

8. The optical element of claim 1, wherein the optical element is transmissive.

9. The optical element of claim 8, wherein for an optical path from the optical input port through at least a portion of the optical element and incident on an underlying portion of the first section of the MEMS actuator, the underlying portion of the first section of the MEMS actuator includes apertures configured to transmit light incident thereon.

10. The optical device of claim 9, wherein the first section of the MEMS actuator is mounted on a chip header, the chip header including apertures configured to transmit light incident thereon from one or more of the apertures of the first section of the MEMS actuator.

11. The optical device of claim 8, wherein the optical element is a transmission diffraction grating.

12. The optical device of claim 8, wherein the optical element is a thin film optical filter.

13. The optical device of claim 8, wherein the optical element is formed of a transmissive dielectric material.

14. The optical device of claim 8, further comprising:
a reflector configured to reflect light incident thereupon along an optical path through the optical element back along an optical path through the optical element.

15. The optical device of claim 8, further comprising:
a photodetector, wherein the optical element is configured to be located in an optical path between the optical input port and the photodetector.

16. The optical device of claim 15, further comprising:
a lens in the optical path between the optical element and the photodetector, the lens configured to focus light incident thereon from the optical element upon the photodetector.

17. The optical device of claim 15, wherein the first section of the MEMS actuator is mounted in the optical device such that the normal direction to surface of the optical element is at an angle relative to the optical path when no voltage difference is applied to the MEMS actuator.

18. The optical device of claim 1, further comprising:
a housing having a first window and a second window, the first section of the MEMS is mounted in the housing such that the optical element is in an optical path between the first window and the second window.

19. The optical device of claim 1, wherein the optical element is attached to the second section through metallic bonding.

20. The optical device of claim 1, wherein the optical element is attached to the second section by epoxy.

21. The optical device of claim 1, wherein the actuator is configured to rotate the second section relative to the first section in response about a first axis and a second axis.

22. An optical device, comprising:
an optical input port;
a photodetector positioned in an optical path from the input port;
a micro-electro-mechanical system (MEMS) actuator having a first section and a second section, wherein the first section mounted in a fixed position within the optical device and the actuator is configured to rotate the second section relative to the first section in response to a voltage difference applied MEMS actuator, wherein the second section has an aperture; and
a transmissive optical element mounted in the aperture and attached to the second section, wherein the optical element is configured to be located in the optical path between the optical input port and the photodetector, wherein the optical input port is configured to hold in place an optical fiber to provide light incident on the transmissive optical element.

23. The optical device of claim 22, wherein the optical element is an optical filter.

24. The optical device of claim 22, wherein the optical element is a grating.

25. The optical device of claim 22, further comprising:
a lens positioned in the optical path between the optical input port and the optical element.

26. The optical device of claim 22, wherein the first section of the MEMS actuator is mounted so that when no voltage difference is applied to the MEMS actuator the normal direction of the surface of the second section of the MEMS actuator is at an angle relative to the optical path.

27. The optical device of claim 22, further comprising:
a ferrule housing the optical input port.

28. The optical device of claim 22, further comprising:
an amplifier circuit configured to electrically amplify a current generated by the photodetector.

* * * * *